Patented Nov. 29, 1932

1,889,704

UNITED STATES PATENT OFFICE

WERNER SCHULEMANN, OF VOHWINKEL, NEAR ELBERFELD, FRITZ MIETZSCH, OF ELBERFELD, GERMANY, AND AUGUST WINGLER, OF WESTFIELD, NEW JERSEY, ASSIGNORS TO WINTHROP CHEMICAL COMPANY, INC., OF NEW YORK, N. Y., A CORPORATION OF NEW YORK

COMPOUNDS OF THE ACRIDINE SERIES AND PROCESS OF MAKING THEM

No Drawing. Application filed November 15, 1929, Serial No. 407,560, and in Germany December 24, 1925.

The present invention relates to new compounds of the acridine series, more particularly it relates to acridines of the general probable formula:

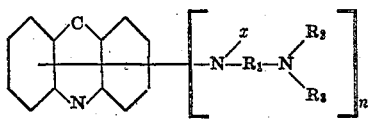

wherein $x$ stands for hydrogen, which may be substituted, for example, by an alkyl group, an aminoalkyl group, or a substituted aminoalkyl group, such as an alkylaminoalkyl group or a dialkylaminoalkyl group, $R_1$ stands for an alkylene radical, in which the hydrogen atoms may be substituted by monovalent substituents, for example, by a hydroxy group, $R_2$ and $R_3$ stand for hydrogen or alkyl groups which may be substituted, for example by an amino group, $n$ stands for one of the numbers one or two and wherein the acridine nucleus may be further substituted, for example, by alkyl, alkoxy, phenyl, halogen and the like.

The manufacture of our new compounds can be effected in several ways, for instance, an amino derivative of an acridine may be caused to react upon by an aminoalkyl halide having the general formula:

$$y \cdot R_1 \cdot N \begin{matrix} R_2 \\ R_3 \end{matrix}$$

wherein $y$ represents a halogen atom, $R_1$ an alkylene radical in which the hydrogen atoms may be substituted by a monovalent substituent, such as the hydroxy group, $R_2$ and $R_3$ stand for hydrogen or alkyl groups which may be substituted, for example, by amino groups.

Instead of the aminoalkyl halide one may use in this process the salt of an aminoalkyl halide with an inorganic acid or a substitution product of the aminoalkyl halide such as the bromoethylphtalimide. In the last case phthalic acid is to be split off subsequently.

Our new compounds can furthermore be manufactured by converting such amino compounds as are suitable intermediate products for the manufacture of amino derivatives of the acridine into aminoalkylamino derivatives and subsequently transforming the latter into the corresponding acridine compounds according to known methods. We are aware of the fact that several other methods for preparing our new compounds are obvious which, however, we do not mention specifically.

The new acridine derivatives are generally yellowish products of a low melting point, generally sparingly soluble in water, soluble in organic solvents, they yield water-soluble salts with inorganic acids and are pharmaceutically valuable products.

The following examples illustrate our invention without restricting it thereto:—

*Example 1.—3.6-bis-(diethylaminoethylamino)-acridine*

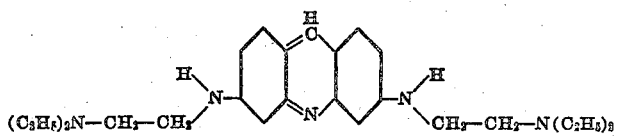

For the preparation of meta-amino-N-diethylaminoethylaniline 100 grams of meta-nitraniline dissolved in 500 ccm. of benzene are mixed with 98 grams of diethylaminoethyl-chloride dissolved in 100 ccm. of benzene and the whole is heated to boiling for 24 hours. The hydrochloric acid salt which crystallizes out, is dissolved in water and the solution is extracted with benzene. The aqueous solution of the hydrochloride of meta-nitro-N-diethylaminoethyl-aniline is separated and reduced with iron powder and acetic acid. The reduction liquid, after the elimination of the iron, is rendered weakly acid with hydrochloric acid and is evaporated to a small volume, after which a large quantity of potassium carbonate is added and the base is extracted with benzene. After freeing the meta-amino-N-diethyl-aminoethyl-aniline from the benzene it boils at 158.5–159° C. under 1 mm. pressure as a water clear easily mobile liquid.

For the preparation of the dyestuff 20 grams of the above described base are stirred together with 16 grams of glycerine, 16 grams of zinc chloride and 12 grams of anhydrous oxalic acid and slowly heated on an oil bath for two to three hours to a maximum temperature of 170° C. The product formed is dissolved in hot water while adding hydrochloric acid, the liquid obtained is filtered and the dyestuff is salted out with common salt. After redissolving the dyestuff, the solution is shaken with nitrobenzene and sodium carbonate in a separating funnel, whereby the zinc free base is extracted by the nitrobenzene. After drying the nitrobenzene solution it is diluted with ether and the dyestuff is then precipitated by means of ethereal hydrochloric acid in the form of a yellowish brown hygroscopic powder, which rapidly dissolves in water with a pure yellow coloration.

*Example 2*

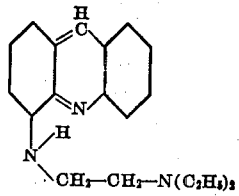

Molecular quantities of 4-amino-acridine and of the hydrochloride of diethylaminoethylchloride are molten together in a closed vessel for 7–8 hours and kept at a temperature of 110–120° C. The reaction product is dissolved in diluted warm hydrochloric acid and filtered from a dark residue insoluble in hydrochloric acid. From its aqueous solution the new base is salted out by the addition of potash, is then dissolved in ether, the ether is distilled off and the new base is purified by distillation in a high vacuo. It is a strongly viscous, golden yellowish oil of the boiling point of 215° C. under a pressure of 1 mm., which dissolved in ether by the addition of ethereal hydrochloric acid forms a violet colored hygroscopic salt which is easily soluble in water with a weak wine-red coloration.

The 4-aminoacridine having a melting point of 105–106° C. and a boiling point of 183–184° C., is obtainable by reduction of 4-nitroacridine with stannous chloride and hydrochloric acid. 4-nitroacridine is obtainable by condensation of ortho-bromonitrobenzene and ortho-aminobenzaldehyde and effecting the formation of the acridine nucleus in concentrated sulfuric acid.

*Example 3*

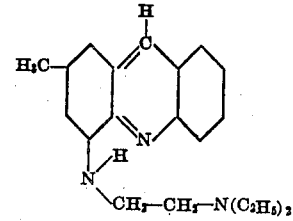

From 2-methyl-4-aminoacridine there is obtainable in an analogous manner as described in Example 2 the corresponding diethylaminoethylamino-compound. It is a golden yellowish strongly viscous oil of the boiling point of 235° C. under a pressure of 3 mm., and forms a weakly violet colored hygroscopic hydrochloric acid salt which is soluble in water with a yellowish coloration.

*Example 4*

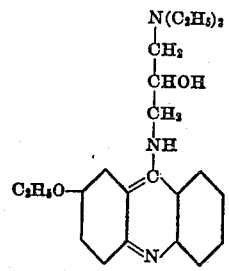

12 grams of 2-9-diethoxyacridine, 7 grams of 1-amino-3-diethylamino-2-propanol and 25 grams of phenol are heated together to about 130° C. while stirring and kept at this temperature for about 15 minutes. After cooling, the melt is treated with diluted caustic soda lye, a strongly smeary mass is obtained which soon solidifies. The new base is recrystallized from acetone containing water, it has a melting point of 74–76° C. and contains 1 molecule of crystal water.

*Example 5*

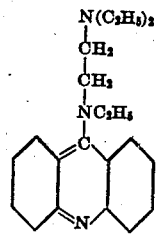

13.5 grams of 9-chloro-acridine are heated in a bomb tube with 60 ccm. of absolute alcohol and 9.1 grams of N-triethyl-ethylenediamine (boiling point 54–55° C. under a pressure of 13 mm.) to about 100° C. for 8 hours. The yellowish brown solution is filtered, the filtrate is evaporated to dryness on the water bath and then dissolved with a 10% acetic acid. The solution is filtered and by the addition of potash the base is set free and extracted with ether. The ethereal solution is dried, and with ethereal hydrochloric acid the yellow hydrochloride is precipitated. It is recrystallized from absolute alcohol, has a melting point above 300° C. and is easily soluble in water with a pure yellow coloration and a green fluoresence.

This is a continuation in part of our application Ser. No. 52,228, filed August 24, 1925.

We claim:

1. Acridine derivatives of the probable general formula:

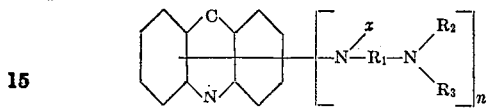

wherein $x$ stands for a substituent of the group consisting of hydrogen and alkyl, $R_1$ stands for an alkylene radical which may be substituted by a hydroxy group, and $R_2$ and $R_3$ stands for alkyl groups which may be substituted by an amino group, "n" stands for one of the numbers one and two, and wherein all nuclei may be further substituted by substituents of the group consisting of alkyl, alkoxy, phenyl and halogen, said products being pharmaceutically valuble substances 2. Acridine derivatives of the probable general formula:

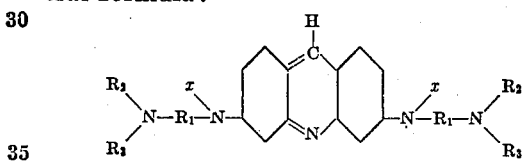

wherein $x$ stands for hydrogen or an alkyl group, $R_1$ stands for an alkalene radical and $R_2$ and $R_3$ stand for alkyl groups, said products being pharmaceutically valuable substances.

3. The acridine derivative of the following probable formula:

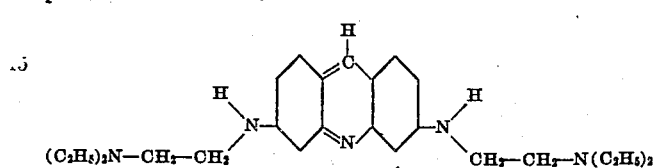

being in the form of its hydrochloric acid salts a yellowish brown hydroscopic powder, easily soluble in water with a pure yellow coloration and being a pharmaceutically valuble substance.

4. Acridine derivatives of the probable formula:

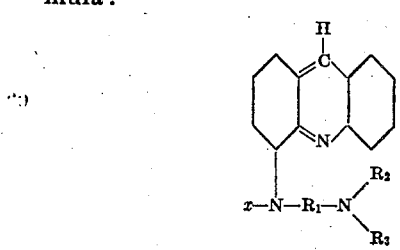

wherein $x$ stands for hydrogen or an alkyl group, $R_1$ stands for an alkylene radical and $R_2$ and $R_3$ stand for alkyl groups, said products being pharmaceutically valuable substances.

5. The acridine derivative of the probable formula:

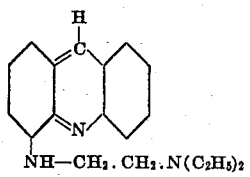

said product being a strongly viscous, golden yellowish oil of the boiling point 215° C. under a pressure of 1 mm., forming with hydrochloric acid a voilet hygroscopic salt which is easily soluble in water with a weak wine-red coloration.

6. Acridine derivatives of the probable formula:

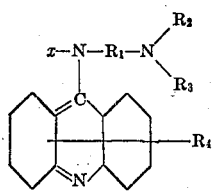

wherein $x$ stands for hydrogen or an alkyl group, $R_1$ stands for an alkylene radical, $R_2$ and $R_3$ stand for alkyl groups and $R_4$ stands for hydrogen or an alkoxy group, said products being pharmaceutically valuable substances.

7. The acridine derivative of the probable formula:

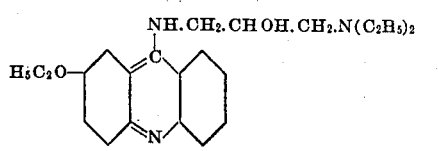

said product melting at 74–76° C., containing one molecule of crystal water, being a pharmaceutically valuable substance.

In testimony whereof, we hereuunto set our hands and affix our seals.

WERNER SCHULEMANN. [L. S.]
FRITZ MIETZSCH. [L. S.]
AUGUST WINGLER. [L. S]